United States Patent [19]
Porteus

[11] 3,732,062
[45] May 8, 1973

[54] METHOD OF AND APPARATUS FOR REDUCING AIR POLLUTION IN THE THERMAL PROCESSING OF ORES AND OTHER MATERIALS

[76] Inventor: John H. Porteus, 1300 S. 27th Place, Apt. A-4, Birmingham, Ala. 35205

[22] Filed: Jan. 20, 1972

[21] Appl. No.: 219,484

[52] U.S. Cl. ..................... 432/16, 432/18, 432/72
[51] Int. Cl. ............................................. F27b 1/00
[58] Field of Search ..................... 263/1, 28, 29, 53

[56] References Cited

UNITED STATES PATENTS

| 2,580,235 | 12/1951 | Lellep | 263/53 |
| 3,271,015 | 6/1966 | Mahony | 263/53 R |

*Primary Examiner*—John J. Camby
*Attorney*—William H. Parmelee

[57] ABSTRACT

Off-gases from the high temperature firing of predominantly inorganic material, as in the manufacture of sinter and cement clinker, calcining and heat-hardening of pellets and other preforms, which have become fouled with various fumes, organic and/or metallic vapors, etc. by being used to dry and preheat the raw material with such fuel and other ingredients as may be mixed with the raw material, are recycled to a zone where they again pass through the highly-heated hot product to incinerate any burnable fumes or other contaminants in the recycled gases. All or part of such gases are then exhausted to the atmosphere while any part of said gases that are not exhausted mix with and are recycled along with the off-gases being currently generated in the process. Shaft furnaces, traveling grate pelletizing and sintering bands, and combination systems are constructed for such recycle of the contaminated off-gases.

13 Claims, 5 Drawing Figures

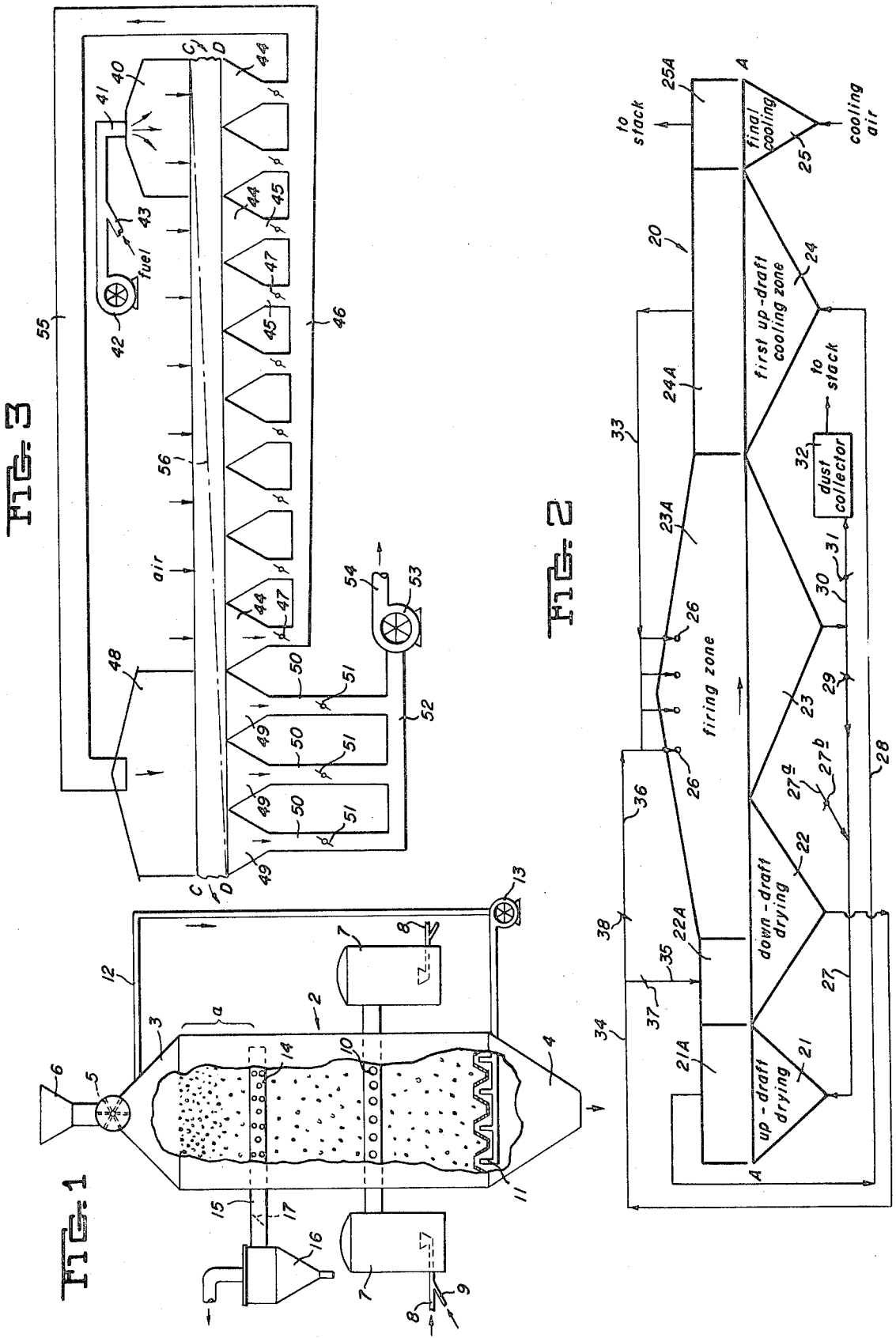

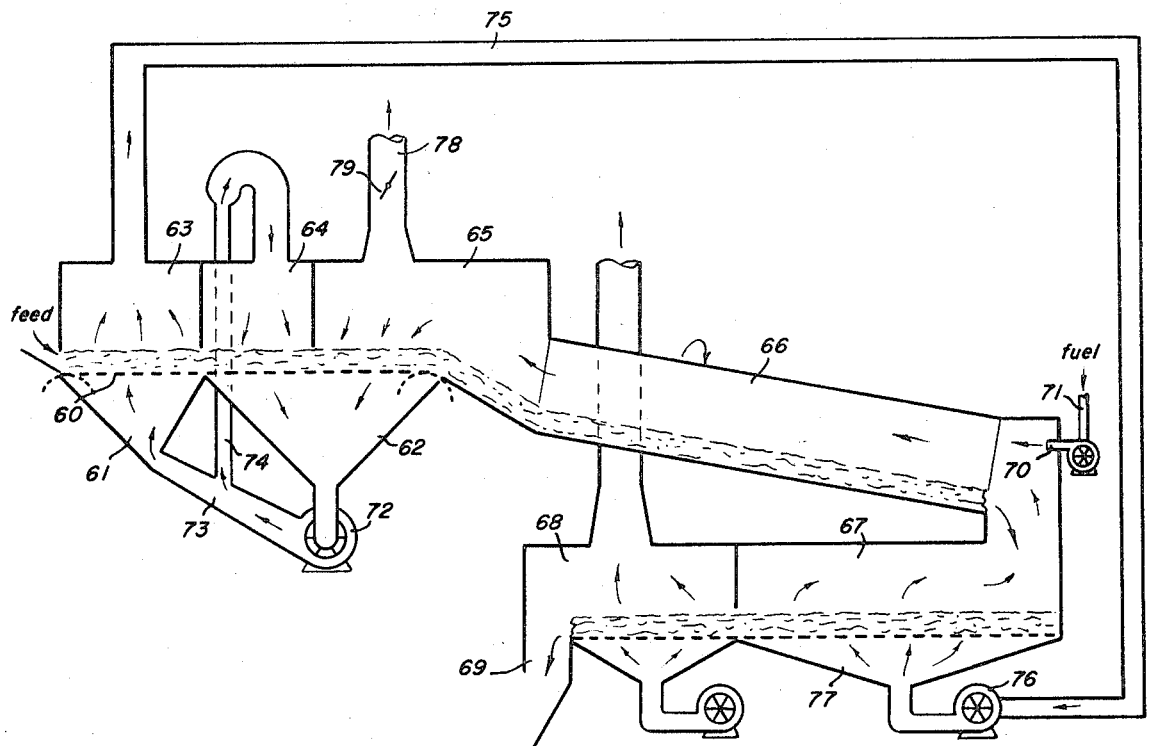
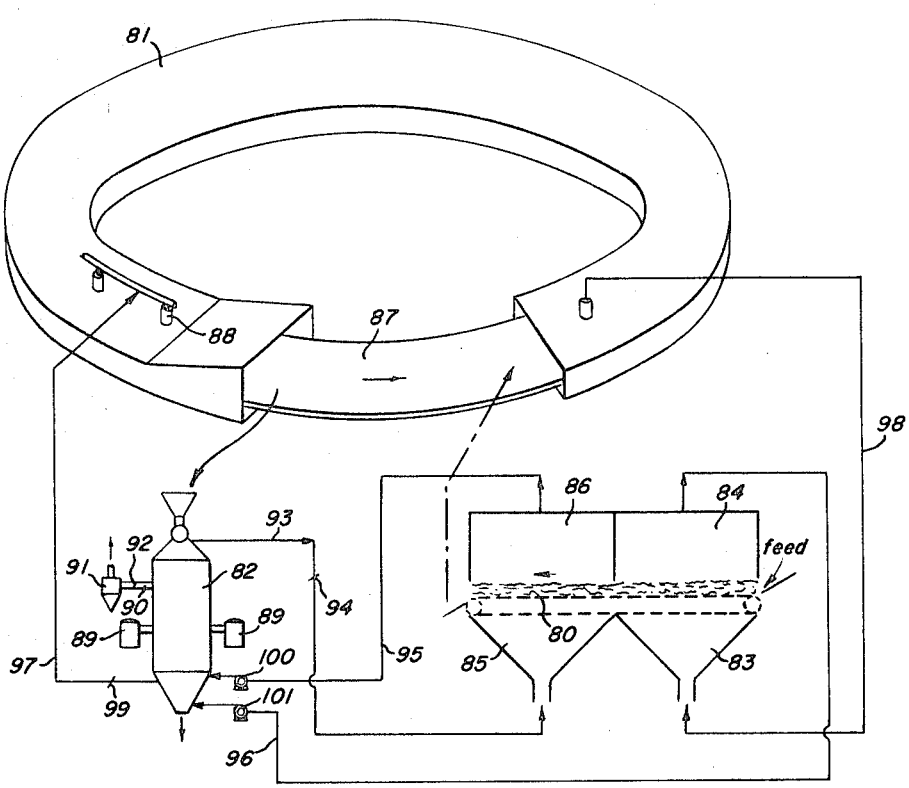

METHOD OF AND APPARATUS FOR REDUCING AIR POLLUTION IN THE THERMAL PROCESSING OF ORES AND OTHER MATERIALS

This invention is for a method of and apparatus for the high temperature firing of various inorganic substances to reduce the atmospheric pollution which results from present practices, but without appreciable impairment of the thermal efficiency.

In many industrial processes, such as beneficiation of ores by sintering or pelletizing, or the manufacture of cement clinker or the burning of lime, to mention some of them, material undergoing treatment is heated to a high temperature, often above 2,000 °F. This may involve the use of an endless traveling grate or sintering band, or a shaft furnace, or a combined endless grate and kiln, or the combination of an endless grate, a rotary hearth and shaft furnace. In some such processes fuel may be combined with the material being processed; at other times hot combustion gases are generated with fuel burners that produce the required heat, and sometimes there may be a combination of burner means and fuel mixed with the material being processed. Also, in some cases the inorganic material being processed may produce an exothermic reaction to provide a substantial part of the heat requirements of the process. In all such procedures forced circulation of combustion air and the products of combustion is effected by the use of hot fans or blowers, and in most cases heat is recuperated by the use of hot gases resulting from the high temperature firing of the product to preheat and dry the green, raw or unfired material. Also, in many cases heat is recuperated in the combustion process from air that has been used to cool the hot product or material after it has been fired.

In all such processes of which I am aware, hot gases from which heat is recuperated by drying and preheating the raw or green material are discharged into the atmosphere, either directly or after passing through a dust collector for the removal of particulate material. Thus, for example, in a shaft furnace where green pellets are charged into the top of the shaft fired to indurating temperature intermediate the top and bottom and then cooled by an updraft of air through the previously-fired hot pellets in the lower portion of the shaft, that air, heated by contact with the hot pellets, is utilized in the firing zone and the hardened cool pellets are discharged at the bottom of the shaft. The hot air and gases from the firing zone rise from the firing zone into the overlying body of green pellets where it preheats and dries the green pellets and such gases are then discharged into the atmosphere. Likewise, in the heat-induration of green pellets on a traveling grate, air may be forced updraft through the fired pellets in a cooling zone, and thereby becomes heated. It then flows into a firing zone where it supplies combustion air and the air and gases pass downdraft through the bed of pellets on the traveling grate. These hot gases are then again passed through the green pellets at the charging end of the traveling grate to dry and preheat the green pellets, after which they are discharged into the atmosphere.

As a third example, in the sintering of iron ore, a deep bed of combined ore and fuel is continuously deposited on a hearth layer at the charging end of a traveling grate or sintering strand and the bed is carried first under an ignition hood where burning gases from burners above the bed are forced down through the bed to ignite the fuel in the top of the bed. From the ignition zone the grate carries the bed over a succession of windboxes and air is drawn down through the bed so that the burning of the fuel, referred to as the "flame-front" progresses further and further toward the bottom of the bed. The air, flowing through the hot bed above the flame-front, cools the bed and recuperates the heat for use at the flame-front while the hot combustion gases and unburned air passing through the bed below the flame front preheats and dries the portion of the bed below the flame front. All of the air and combustion gases so used or generated are discharged into the atmosphere. Particulate material may be removed by conventional dustcollecting apparatus.

The foregoing are representative of various high temperature firing processes with which the present invention is concerned, but by no means inclusive of all such processes. The point is that gases passing through or generated in the hottest or very hot zones of the apparatus flow immediately into contact with the green material and are then discharged into the atmosphere. In flowing through the green material to dry and preheat it, these gases collect not only moisture, but pick up volatiles from fossil fuels such as oil and coal, partial oxidation products of various organic bonding or additive materials, fumes from oil or other organic wastes that may be present in shop or other wastes, and metallic vapors of low melting point metals, as lead and zinc that are frequently mixed with or comprise a part of the charge, as well as both combustible and non-combustible particulate materials, such as coke breeze, ore dust, coal dust and the like, depending on what is being burned or where the process is being practiced. The particulate material may be removed in conventional dust collectors, but the volatiles and metal or fuel vapors and other fumes are discharged into and pollute the surrounding atmosphere.

The present invention proposes the modification or redesign of apparatus as presently constructed, and the improvement in methods as presently practiced to circulate all air or gases used in drying and preheating the material being fired into the very hot zones where combustible and metallic vapors and fumes are incinerated, temperatures ordinarily being well above 2,000°F., and particulate substances may be largely burned or fused into the hot product, thus reducing, if not practically eliminating in some cases, the burden of particulate solids discharged into the atmosphere, as well as eliminating most objectionable fumes and vapors. Only sulphur dioxide which may be present in objectionable amounts in some cases remains for removal by further conventional processing. Taking the examples above cited, in the shaft furnace air and products of combustion used to dry and preheat the layers of charge above the firing zone are recirculated to the bottom of the shaft to rise eventually into the firing zone where the highest temperatures prevail, and where incineration of volatiles and combustible pollutants takes place. From here the gases are cleansed and freed of combustibles, or at least some substantial percentage of them, are withdrawn and exhausted to the atmosphere, usually through a dust collector for removal of entrained particles.

In the pelletizing example above outlined, gases from the drying and preheating zones are recirculated either directly to the hood over the firing and indurating zone to pass through the bed where it is at an incinerating temperature, and/or circulated to the cooling zone and then to the firing and indurating zone. In either case gases are discharged to the atmosphere only after they have been thus recycled through the highly-heated bed to incinerate the impurities which they acquired in drying and preheating other pellets.

Likewise, in the sintering apparatus a hood is placed over the sintering strand near the discharge end and gases and air from the windboxes ahead which have passed down through the bed to dry and preheat the bed below the flame front are conducted to this hood to pass down through the incandescent sinter where any remaining material below the flame front has already been so thoroughly dried and preheated as to yield no further, or at least for all practical purposes, no further products to be incinerated. In so passing down through this terminal portion of the bed where perhaps the highest temperatures prevail, fumes and volatiles that have been acquired in the use of the gases for drying and preheating the bed are incinerated, whereupon the gases are then exhausted directly to the atmosphere, preferably, as in all cases, through a dust collector.

In addition to substantially reducing atmospheric pollution, it is expected that the process will improve the economy of the apparatus by reduction of power requirements for the fans used for circulating the air and gases.

My invention may be more fully understood by reference to the accompanying drawings in which several forms of apparatus are schematically illustrated, the invention residing in the gas flow arrangements while the specific apparatus details per se are well known. In the drawings:

FIG. 1 illustrates schematically a shaft furnace constructed to embody the apparatus and practice the method of my invention;

FIG. 2 illustrates schematically an endless grate constructed to embody the apparatus and practice the method of my invention for heat-induration of pellets and other formed bodies of ore or other material;

FIG. 3 illustrates schematically the invention as applied to an endless or traveling grate employed for sintering ore, burning cement clinker or lime, the manufacture of light-weight aggregate and the like;

FIG. 4 illustrates schematically the invention as applied to a grate-kiln apparatus and method for firing pellets or other agglomerates and other processes in which lumps or bodies of rock, ore, minerals or the like are fired to indurate, calcine, sinter or otherwise process them at high temperatures; and FIG. 5 illustrates schematically the invention as applied to a so-called "Heat Fast" or similar system of pelletizing using in combination a traveling grate, a rotary hearth and a shaft furnace.

Referring first to FIG. 1 there is a shaft furnace 2 of a type well known in the art having a hood 3 at the top and a discharge cone 4 at the bottom. Pellets or other preforms to be fired, such as briquettes, agglomerates or other bodies, usually having admixed therewith a fossil fuel such as powdered coal or oil, are introduced into the top of the furnace through an air-lock of some kind, here schematically indicated as a star-wheel feeder 5, from a hopper 6. Fuel burners 7 intermediate the top and bottom of the furnace supply hot combustion gases and air to the mid section of the furnace to travel upward through the furnace and effect the burning of the fuel in the pellets or other bodies in the furnace. At a level usually more than twelve to 14 inches below the top of the bed the volatiles in the fuel will have been consumed and the pellets will be at or near an indurating temperature above 2,000° F. and in all cases well above the 1,400° F. –1,500° F. level required for fume incineration. Fuel and combustion air supplied to these burners are indicated at 8 and 9 respectively, and 10 indicates tuyers or other means for introducing the hot gases into the shaft.

Near the bottom of the furnace 2 are perforated cones or other shaft air inlet means 11. In the usual process of operating a shaft furnace there would be no air seal at 5 and the hot gases rising through the layer of green pellets above the firing zone would preheat the pellets immediately above the firing zone and dry the green pellets at the top and be vented to atmosphere at the top of the furnace.

With the present invention there is a duct 12 which may include a fan 13 that circulates gases and air from the top of the furnace to the air inlet cones in the lower portion of the furnace. At a level of the furnace where the temperature of the pellets will have reached 1,600° F. or more and at least twelve to 14 inches--and preferably more—below the top of the uppermost layer of pellets in the furnace there are one or more perforated refractory ducts 14 through which gases and air in which all burnable impurities have been incerated- —which should occur at around 1,400° F.—is withdrawn into duct 15 and dust collector 16 and then discharged into a stack (not shown). There is a damper indicated at 17 to regulate the volume of air and gases withdrawn in relation to the amount which remains in the furnace to rise through the overlying charge in the zone indicated by the bracket a to effect preheating and drying of this portion of the charge. It is this portion of the gases used for preheating and drying that becomes contaminated and which has heretofore been discharged into the atmosphere. With the present invention only gases and air that have traveled up through the hottest part of the charge in the furnace and hence which are most free of objectionable gases and vapors are exhausted into the air.

Assuming, for example, that combustion air is 10,000 SCFM and shaft air is 15,000 SCFM, the process as heretofore practiced would discharge all 25,000 SCFM to the atmosphere, whereas with the present invention 10,000 SCFM could be withdrawn into duct 15 and 15,000 SCFM recirculated, requiring only a "make-up" of 10,000 SCFM. While the present process might lose some heat in the hot gases withdrawn through pipe 15 which would have been largely recuperated, at least theoretically, the reduced power requirements for bringing into the system only 10,000 SCFM, and the reduced heat loss with the discharge of only 10,000 SCFM as against 25,000 SCFM more than offsets the heat loss which results from discharging a part of the very hot gases directly to the stack without recuperation of the heat.

I have described the process as being one where the pellets or other charge may have fuel mixed therewith, but this might not always be the case, and in such case all the heat would be supplied from the burners 7. Also, in some cases the process might be one in which pellets are reduced from a higher oxide to a lower one or partially at least, reduced to metal, but the process insofar as circulation of gases and air would be the same, as would also be the case with calcining lime or other high temperature shaft furnace operations.

It is to be noted that in this, as well as the processes to be hereinafter described in detail, the heat of the product being processed induces incineration or cleaning of non-solid pollutants from the waste gas and no after-burner, as required by many processes, is needed.

In FIG. 2 there is schematically indicated an endless traveling grate type of apparatus commonly used in the indurating of pellets and other agglomerates and preforms. The apparatus designated generally as 20 has the pass line of the endless grate designated generally by the line A—A. The travel of the endless grate is in the direction of the arrow shown in FIG. 2. Below the endless grate at the charging end there is a windbox area 21 which is for updraft drying; a second windbox area 22 follows this, and is for downdraft drying, preheating, and may include a portion of the firing zone. Next there is a windbox area 23 that is below the major portion of the firing zone and the so-called after-firing or indurating zone. Following this is a windbox area 24 for the principal or first updraft cooling zone, and beyond this is a windbox area 25 for final cooling. Above the traveling grate there is a hood 21A for the updraft drying gas; 22A over the downdraft drying and preheating zones, and a hood 23A over the firing and indurating zones. There is a hood 24A over the first cooling zone and a hood 25A over the final cooling zone. Under the hood 23A there may be a series of fuel burners 26. This arrangement is more or less typical of traveling grate pellet firing apparatus and is of the general type shown in U.S. Pat. No. 3,172,754. All details such as the number of windboxes in each area, the provision of dampers, the design of seals, etc. are well known in the art.

The hottest gases that are generated in the operation of the apparatus are discharged into the windbox area 23 below the firing and indurating zone. Customarily some of these gases are carried forward to circulate up through the updraft drying zone and from the updraft firing zone they are generally discharged into the atmosphere. Some of these gases may also be used in the downdraft drying zone, while some may be discharged directly to the atmosphere. According to the present invention the highly-heated gases from the windbox area 23 are conducted through duct 27 to the windbox area 21 in the updraft drying zone. From the updraft drying zone these gases are conducted through a passage 28 to the windbox area 24 in the first cooling zone. A damper at 29 may control the flow of hot gases through the duct 27. Gases and air discharged from the windbox area 23 not used for updraft drying may be discharged to the atmosphere through pipe 30 in which there is a damper 31. This pipe may discharge into a dust collector 32 of any known preferred type where particulate material is removed, and from which the cleaned gases pass to the stack (not shown). Tempering air may be introduced into line 27, as indicated at 27a and damper 27b.

The hot gases that pass through the duct 27 to the windbox area 21 of course are cooled in passing through the green pellets at the charging end of the grate, and in addition they become polluted with various vapors and gases as previously described. They may therefore be used in the initial cooling zone where they contact the hottest pellets. To some extent impurities carried in these gases and air up through the bed in the first cooling area will be incinerated or consumed. However, all of the gases and air from the hood 24A are carried forward through duct 33 and discharged into the hood 23A over the firing and indurating zone. Here they pass down through the bed of pellets in the vicinity of the portions of the bed where temperatures are well above the incinerating temperature of any gases or combustible vapors still remaining in the recirculated gases to thereby completely remove these impurities. Gases from the windbox 22 which also include some vapors and fumes as well as particulate matter from the drying and preheating operation are circulated through the duct 34 for recycle either to the drying and preheating through branch pipe 35, or into the firing and indurating zone through the branch pipe 36. Dampers at 37 and 38 in the pipes 35 and 36 respectively regulate the volume of flow through these two lines. Other parts of the apparatus, as for example the final cooling zone, are not particularly relevant to the invention which embodies the circulation or recycling of gases used for drying and preheating through an incinerating zone before discharging them into the stack system.

Make-up air may be introduced in part as primary air to the burners 26 in the firing zone or as tempering air into the line 33, or may be elsewhere introduced as required, but here again, while there may be a large volume of gases and the air circulating through the system, the make-up air need only balance the amount which is bled through line 30 to the stack, except for leakage.

FIG. 3 discloses the invention as applied to a sintering strand of the traveling grate type. The sinter bed in this figure is confined between the lines C—C at the top and D—D at the bottom. Generally the bed comprises the material to be burned or fired or sintered, such as ore or from cement clinker-forming ingredients or possibly limestone or the like to be calcined. The raw material combined with fuel is loaded onto the traveling grate at the right end as viewed in FIG. 3 and carried toward the discharge end at the left of the figure. Over the charge-receiving end of the bed on the traveling grate there is an ignition hood 40 having a burner 41 to which air is supplied by a blower 42, and to which gases or other fluid fuel is supplied through pipe 43. Below the grate there are a series of windboxes, each of which is designated 44, and each of which communicates through passage 45 to a common outlet duct 46. Dampers are indicated at 47 to regulate the flow of gases to each windbox. The sinter bed beyond the ignition hood 40 is open to the ambient air. Normally this exposure to the ambient air would extend to the discharge end of the grate, but according to the present invention there is a hood 48 over the bed at the discharge end and there are separate windboxes 49 under this portion of the bed leading through passages 50 in which there may be dampers 51 to a common duct 52 which terminates in a suction fan 53. The discharge 54 of the suction fan leads to a conventional or preferred dust collector not shown, but which would appear schematically as the dust collectors do in either FIGS. 1 or 2, and from the dust collector the gases are delivered to the stack for discharge into the air.

With the present invention the duct 46 leads into a duct 55 which opens into the hood 48.

The sinter bed varies in depth in different plants but may be of the order of 2 feet in depth. As the bed travels under the ignition hood the fuel at the top of the bed is ignited and the burning gases travel down through the bed to preheat and dry the underlying bed of green material and fuel before being drawn into the windboxes 44. As the burning portion of the bed progressively moves along over the succeeding windboxes, atmospheric air drawn down through the bed sustains the combustion on a gradual downward slope as indicated by the broken line 56 so that the air drawn into the suction boxes 44 is increasingly used to cool the burned sinter above the diagonal line 56 which is generally referred to as the "Flame Front", and decreasingly preheat and dry the bed below the flame front which is of course of gradually reducing depth. By the time the flame front reaches the area covered by the hood 48 the remaining portion of the bed will have been completely preheated and dried and will be at its highest temperature approaching that of the flame front of 2,350° F. to 2,450° F. With the arrangement and process here illustrated, all of the gases and air that enter the windboxes 44 and which will be contaminated with vapors and smoke from the fuel and/or with other combustible vapors or compounds will be passed through the bed under the hood 48 where the highest incinerating temperature will be encountered, resulting in the burning of the oxidizable products and the incineration of impurities. Even particulate matter, as in the other processes, may be fused in this zone to the previously-formed sinter, reducing the amount of particulate matter which passes through the fan to the dust collector.

Here again all gases used in preheating and drying the bed pass through a flame front or high temperature zone well above an incinerating temperature for the impurities in the gases before being discharged to the atmosphere. The ignition zone and the entire length of the flame front may be hereinafter sometimes referred to as the firing zone or high temperature processing zone.

FIG. 4 discloses the application of this invention to the so-called grate-kiln process commonly used for hardening pellets and other preforms or agglomerates. In this apparatus the pellets are fed onto a traveling grate designated 60 which moves over windbox areas 61 and 62 and under hoods 63, 64 and 65, hood 63 being over an updraft zone, and hood 64 is over a downdraft drying and preheating zone, and hood 65 is over a preheating zone. The preheated product from the discharge end of the traveling grate passes into the receiving end of a rotary kiln 66 where the pellets are fired to the maximum temperature and indurated. From the rotary kiln 66 the fired pellets are discharged into a first cooling zone 67 and then into a second cooling zone 68, and they are discharged at 69. A fuel burner designated 70 having a blower and a fuel supply designated 71, fires directly into the rotary kiln 66. Combustion gases and air from this burner are withdrawn at the inlet end of the kiln into the hood 65 over the preheating zone. The hot gases are drawn down through the bed of pellets on the traveling grate to preheat them, the gases flowing into the windbox 61 to pass updraft through the drying zone. A portion of these gases are withdrawn through duct 74 for discharge into the hood 64 for downdraft drying of the bed of pellets, the gas so circulated flowing through the bed of pellets back into the windbox 62.

In a system of this kind as heretofore operated, the gases leaving the hood 63 and bearing all of the impurities picked up in the preheating downdraft and updraft drying would be discharged into the atmosphere. According to this invention a duct 75 leading from the hood 63 carries the gases and air from the hood 63 to a fan 76 which forces them up through a windbox 77 under the first cooling zone 67. These gases then flow, as indicated by the arrows, into the kiln 66 where they mingle with the combustion gases from the burner 70 and contact the hot pellets in the kiln and in the discharge end of the preheating zone. A portion of these gases will of course flow with the combustion gases down through the bed of pellets in the preheat zone as previously described, but an offtake conduit 78 in which is a damper 79 will bleed part of these gases as well as part of the combustion gases from the system to the atmosphere. Pipe or conduit 78 will carry the gases which are withdrawn through it to a conventional or preferred form of dust collector as previously described, and from the dust collector they will be discharged into a stack and thence into the atmosphere.

Here again it will be seen that all of the gases which have been used to preheat and dry the pellets and which have accordingly become contaminated by contact with the green pellets will pass through the hottest zone of the furnace to incinerate any combustible gases or other products and be discharged then to the atmosphere where they are relatively innocuous. Cooling air supplied to the windbox under the second cooling zone 68 is exhausted directly to the atmosphere.

FIG. 5 shows the invention as applied to a "heat-fast" pellet burning operation.

The pellets are first charged into a traveling grate designated generally as 80. They are then conveyed onto a rotary hearth designated generally as 81. They are discharged from the rotary hearth into the top of a shaft furnace designated generally as 82, and finally are discharged from the shaft furnace in a fully burned condition.

More specifically, green pellets or other preforms or bodies to be fired are charged onto the traveling grate 80 at the right end as viewed in FIG. 5. In the first portion of their travel on the grate the green pellets are carried through an updraft drying section indicated by windbox 83 and hood 84. They move then into a second drying section, also preferably an updraft drying and preheating section, indicated by windbox 85 and hood 86. The arrangement is such that dried and initially preheated pellets are deposited on a rotary hearth structure 81 having a rotating hearth 87 that carries them through an enclosure which is supplied with heat from fuel burners 88, the hot gases from which circulate counter to the direction of rotation of the hearth. Here the pellets are preheated to a temperature of the order of 2,000° F. in accordance with usual practice. From the discharge end of the enclosure the preheated pellets are charged directly into the top of the shaft furnace 82 through an air-lock, as schematically illustrated in FIG. 1. External or internal burners schematically indicated at 89 quickly bring the pellets in the upper portion of the shaft furnace to indurating temperature, usually in a range between 2,400° F. and 2,450° F. The operation of course is a continuous one, as it is in the other methods herein described.

The overall organization of the grate drier, the rotary hearth and the shaft furnace is known, but as heretofore operated the gases from the drier and preheater have been discharged directly into the atmosphere. According to the present invention offgases and air from the top of the shaft furnace are removed and part of them are bled off into duct 90 and conducted to a dust collector for removal of particulate impurities and then discharged into the stack for discharge into the air. The dust collector is indicated at 91, and 92 is a damper to regulate the flow of gases to the stack.

The rest of the gases and air from the top of the shaft furnace are conducted through duct 93, in which is a flow-regulating damper 94, to the windbox 85 of the grate-drier unit. After passing up through the bed of pellets, this stream of gas and air flows from hood 86 through duct 95 to shaft air inlet cones, as shown in FIG. 1 for example, in the lower part of the shaft furnace 82. Inside this furnace the gas and air so discharged move up through the shaft furnace and the pellets where they reach their maximum temperature, thus insuring the incineration of combustible pollutants before any part of the combustion gases or air is discharged to the stack.

At the lowermost part of the shaft furnace there is a cooling air inlet duct 96 and above it a cooling air outlet duct 97. Duct 97 carries air and gases that have been heated by contact with hot pellets in passing upwardly in the lower part of the shaft furnace and conveys primary and/or secondary combustion air to the burners 88 of the rotary hearth unit. Gases and air are removed from near the entering end of the rotary hearth enclosure through duct 98 and discharged into the windbox 83 of the grate drier to dry the incoming green pellets and be cooled thereby as they pass upwardly through the bed of pellets on the grate into hood 84. The cooling gas inlet duct 96 conducts this cooled flow of air and combustion gases to the lower portion of the shaft furnace as above described. A damper or other flow-regulating device 99 in pipe 97 diverts some of the air and gas flow in this part of the system up into and through the shaft furnace to be incinerated and flow out the top of the shaft furnace to escape to the atmosphere or recirculate through the system as heretofore described. Blowers or fans will be used in accordance with usual practice to secure the required flow of gases and air. The location of any such fan or fans will be selected to best perform their purpose, as will be well understood by those skilled in the art, but for the purpose of completeness of this disclosure one fan has been indicated at 100 in line 95 and at 101 in line 96.

From the foregoing specific embodiments of the invention and the methods of practicing the same, it will be seen that it involves apparatus the components of which have been heretofore successfully used. However, according to this invention where heated offgases that have heretofore been used to dry and preheat the pellets or other material being thermally processed, and which have become objectionable from being so used are not now discharged into the stack without first being recycled through a high temperature zone and then entirely or in part exhausted directly to the atmosphere through some sort of dust collector. By being so recycled and heated the polluting gases and vapors are burned or incinerated. In this process some entrained solid particles in the nature of ash or dust may be fused onto the incandescent product which is being processed and thereby reduce the required capacity of the conventional dust collectors. Wherever applicable the term "pellets" will include briquettes or other formed bodies, and the term "sinter" will include clinker, calcined material, or fused ceramic bodies. Thus, in the same manner, the invention is applicable to cement and lime kilns where hot combustion gases have heretofore been used to dry and preheat the raw material, and wherein burning and cooling may be effected in various types of apparatus, including apparatus as herein disclosed or other conventional apparatus and as rotary kilns where the firing occurs in one kiln and cooling in another.

In addition, in the several processes as herein described, there is a maximum of gas recirculation with a minimum of exhaust, so that as specifically pointed out in connection with FIG. 1 but inherent also in the other embodiments, loss of heat from exhausting some of the hottest gas to the stack is offset by the reduced energy requirements of the fans and possibly a more effective recuperation of heat from the body of circulating gases and air which are being recirculated.

I claim:

1. In the thermal processing of predominantly inorganic solid material which is fired to a temperature in excess of 1,600° F. by a process where heat is recuperated from hot gases that have been discharged from the heat processing of said material by passing said hot gases through a body of unfired material about to be heat processed to thereby dry and preheat the unfired material whereby the gases so used become contaminated with fumes and vapors, the steps which comprise:
    a. recycling all gases so used through a body of the inorganic material where it is at a temperature of at least 1,600° F. to incinerate any combustible contaminants contained therein, and
    b. discharging at least a portion of the gases so recycled to the atmosphere before said gases may again contact material which has been so preheated.

2. The process defined in claim 1 wherein the portion of the gases so discharged to the atmosphere is removed directly from an area of the bed where the temperature is above 1,600° F.

3. The method defined in claim 2 in which a portion only of the recycled gas is discharged to the atmosphere and the remainder, mingled with hot make-up gases, passes again through unfired material to dry and preheat the same.

4. The method defined in claim 3 wherein the make-up gases are supplied at least in part through fuel burners.

5. The method defined in claim 4 wherein the volume of combined make-up and recycled gases used to dry and preheat the unfired material exceeds the volume discharged to the atmosphere.

6. In the method for the continuous high temperature firing of a predominantly inorganic material wherein the material is raised to a maximum temperature in excess of 1,600° F. in a firing zone by the burning of fuel and wherein hot gases from the firing zone are then passed through unfired material in drying and preheating zones to preheat said material and at least partially cool said gases, the steps of:
  a. recycling the gases so used in the drying and preheating zones back through the firing zone and exhausting at least a portion thereof at high temperature from the firing zone to the atmosphere whereby combustible pollutants in the recycled gas are incinerated in the firing zone before discharge thereof to the atmosphere.

7. The method defined in claim 6 wherein the firing zone is maintained between the top and bottom of a shaft furnace and the preheating and drying zones are above the firing zone and there is a body of fired pellets in a cooling zone below the firing zone, characterized by the steps of circulating gases from the top of the shaft furnace into the cooling zone near the bottom of the furnace and the gases which are exhausted to the atmosphere are withdrawn from the firing zone below the level of the preheating and drying zones, while combustion gases from the burning of fuel with air heat the material in the firing zone and such combustion gases combine in part with the recycled gases being exhausted and in part with the gases which are so circulated from the top of the furnace to the cooling zone near the bottom.

8. The method defined in claim 6 wherein the firing zone is maintained in a bed of material on a traveling grate on one end of which the green material to be fired is charged to form a continuous layer and from the other end of which the fired product is discharged with drying and preheating zones being provided along the grate between the charging end and the firing zone and with a cooling zone being provided along the grate between the firing zone and the discharge end of the grate and wherein:
  a. combustion gases generated in the firing zone by the burning of fuel are at least in part forced through the bed of material on the grate in the drying and preheating zones and then recycled through the bed of hot material in the firing zone to effect the incineration of combustible contaminants in the recycled gases and to mix with the newly generated combustion gases, and
  b. venting a portion of the mixed newly generated and recycled gases to the atmosphere from the firing zone.

9. The method defined in claim 8 in which the material being processed is sintered and wherein the raw material combined with fuel is continuously formed into a bed at the charging end of a traveling grate and carried by the grate toward a discharge end first through an ignition zone to ignite the fuel in the uppermost portion of the bed and then carried over a succession of windboxes by which air is drawn through the bed to sustain combustion and a progressively deepening flame front is maintained in the bed from the charging end toward the discharge end to progressively sinter the material downwardly from the top of the bed and wherein the hot products of combustion passing through the bed below the flame front dries and preheats the raw material below the flame front in which:
  a. all of the products of combustion and air drawn into said series of windboxes and utilized to dry and preheat the raw material in the bed are circulated downdraft through the bed adjacent the discharge end of the grate where most of the bed has been fired and is close to the maximum temperature of firing and all of the bed still remaining under the flame front has been dried and preheated, and
  b. at least a portion of the gases and air so circulated through the bed near the discharge end are then exhausted to the atmosphere.

10. A thermal processing apparatus of the type used for firing a substantially inorganic material to indurate, sinter or calcine the raw material wherein the material is moved progressively in continuous progression through drying, preheating and firing zones and off-gases from the firing zone are circulated through the raw material in the drying and preheating zones characterized by the provision of means for conducting gases so used in the drying and preheating zones back to the firing zone to effect incineration of combustible pollutants which said gases acquire in the drying and preheating of the raw material, and further characterized by the provision of means for exhausting at least some of the hot gases so recycled directly from the firing zone to the atmosphere.

11. Apparatus as defined in claim 10 in which there is also a cooling zone through which the material is moved after it leaves the firing zone wherein means is provided to circulate at least some of the off-gases from the firing zone which are used for drying and preheating the raw material through the fired material in the cooling zone in being recycled to the firing zone.

12. The invention as defined in claim 11 in which the apparatus is a shaft type of furnace having an enclosed top with an air-lock means through which raw material is charged into the top of the furnace and said means for conducting off-gases from the firing zone after they have been used to dry and preheat raw material comprises a duct leading from the enclosed top of the shaft furnace to the lower portion of the shaft furnace, and fuel burning means is provided above said lower portion and below the top of the furnace and the cooling zone is between the firing zone and the lower end of the furnace.

13. The invention defined in claim 11 in which said apparatus comprises an endless grate having a charging end and a discharge end and having hoods thereover and windboxes thereunder establishing drying, preheating, firing and cooling zones with a duct for transferring hot gases from the windboxes of the firing zone into and through the raw material on the grate in the drying and preheating zones, said means for recycling combustion gases from the drying zone comprising a duct into which said gases, after passing through the bed of material on the grate in the drying zone, are first conducted through the bed of fired material in the cooling zone, said cooling zone having a duct for then circulating said gases to the firing zone, and means for exhausting some gases from the firing zone to the atmosphere.

* * * * *